United States Patent
Rimini et al.

(10) Patent No.: US 9,160,386 B2
(45) Date of Patent: Oct. 13, 2015

(54) NON-LINEAR INTERFERENCE CANCELLATION ACROSS AGGRESSOR TRANSMITTERS AND VICTIM RECEIVERS

(71) Applicant: QUALCOMM Incorporated, San Diego, CA (US)

(72) Inventors: Roberto Rimini, San Diego, CA (US); Jibing Wang, San Diego, CA (US); Geert Arnout Awater, Utrecht (NL)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 13/857,941

(22) Filed: Apr. 5, 2013

(65) Prior Publication Data

US 2014/0301498 A1 Oct. 9, 2014

(51) Int. Cl.
*H03D 1/04* (2006.01)
*H04B 1/12* (2006.01)

(52) U.S. Cl.
CPC ........................................ *H04B 1/12* (2013.01)

(58) Field of Classification Search
None
See application file for complete search history.

(56) References Cited

U.S. PATENT DOCUMENTS

| | | | |
|---|---|---|---|
| 8,170,487 B2 | 5/2012 | Sahota et al. | |
| 2009/0325509 A1* | 12/2009 | Mattisson et al. | 455/75 |
| 2011/0149714 A1 | 6/2011 | Rimini et al. | |
| 2011/0170473 A1* | 7/2011 | Proctor et al. | 370/315 |
| 2011/0195673 A1* | 8/2011 | Pratt et al. | 455/78 |
| 2012/0093269 A1 | 4/2012 | Yu et al. | |
| 2012/0288039 A1 | 11/2012 | Kim et al. | |
| 2013/0044791 A1 | 2/2013 | Rimini et al. | |

* cited by examiner

*Primary Examiner* — Adolf Dsouza
(74) *Attorney, Agent, or Firm* — DeLizio Law, PLLC

(57) ABSTRACT

Systems and methods are disclosed to implement non-linear interference cancellation (NLIC) across chips or dies in communication systems to cancel or mitigate self-jamming interference. A victim transceiver may receive an analog baseband transmit (Tx) signal from an aggressor transceiver. The analog baseband Tx signal may be tapped from a digital analog converter (DAC) of the aggressor transceiver. Alternatively, the analog baseband Tx signal may be generated by the aggressor transceiver using an auxiliary down-conversion and filtering stage. The victim transceiver may receive a composite baseband Rx signal from the victim transceiver frontend. The composite baseband Rx signal includes the desired Rx signal and an interference signal. The victim transceiver may sample the analog baseband Tx signal to generate a digital signal replica of the analog baseband Tx signal for the NLIC operation to cancel or mitigate the interference signal present in the composite baseband Rx signal.

51 Claims, 5 Drawing Sheets

NON-LINEAR INTERFERENCE CANCELLATION ACROSS AGGRESSOR TRANSMITTERS AND VICTIM RECEIVERS

TECHNICAL FIELD

This application generally relates to communication systems. In particular, this application relates to cancelling self-jamming interference induced by a transmitter on a receiver of a communication system when the transmitter and the receiver are implemented as separate chips or dies of the communication system.

BACKGROUND

Wireless communication systems are widely deployed to provide various types of communication content such as voice, data, and so on. It is common to integrate multiple radios into a single communication system. For example, smartphones may have radios to support cellular communication, WiFi, GPS, and Bluetooth, etc., each operating on a different frequency band. Even for systems that have just a single radio, the radio may be a frequency division duplex (FDD) system, in which the transmit (Tx) and receive (Rx) links simultaneously operate on different frequency bands. In these systems, the strongest interference on an Rx signal may be caused by self-jamming leakage from a Tx signal that is simultaneously transmitted by the systems. For example, the Tx signal may leak to the Rx path through the finite isolation between the Tx and Rx paths. Although in a different frequency band, the Tx leakage signal may cause co-channel interference on the intended Rx signal due to non-linearities in the Rx chain. For example, non-linear behavior in the radio frequency (RF) down conversion components: such as low noise amplifier (LNA), mixer, switches, filters, data converters, etc., operating on the Tx leakage signal may generate interference in the Rx frequency band. Another scenario for Tx self-jamming arises when non-linearities present in the transmitter chain generate spectral re-growth such as harmonics of the Tx frequency that fall in the Rx frequency band. The effects of the self-jamming interference due to non-linearities of the Tx or the Rx chains are degradation in the performance of the communication systems.

If the Tx and Rx chains are on the same die, the Tx waveforms that generate the interference are known. Hence, the interference component at the victim Rx chain may be constructed via an adaptive non-linear interference cancellation (NLIC) scheme. For example, the NLIC may generate, based on the known baseband Tx signal, an estimate of the interference in the baseband Rx signal due to the Tx/Rx non-linearities. The Rx chain may remove the estimated interference from the baseband Rx signal to cancel or to mitigate the interference. In this regard, if the aggressor baseband module and victim baseband module are on the same die, NLIC may be implemented by streaming the digital baseband Tx samples from the aggressor baseband module to the victim baseband module via an internal bus or a shared memory.

However, there are situations where it may not be desirable to integrate the Tx and Rx chains, such as the aggressor baseband module and the victim baseband module, on the same die or chip. For example, integration of the Tx/Rx chains from the same radio or different radios on one transceiver die carries the risk that design bugs, design enhancements, or technology upgrade in the Tx or Rx chains may require a re-spin of the entire design. In another example, the bus/memory shared by the aggressor/victim baseband modules may become a limiting factor when the Tx and Rx chains are running at maximum speed or when trying to optimize the performance of the Tx or Rx chain. Furthermore, it may be desirable to pair Tx and Rx chipsets from different vendors together for specific feature-set requirements. Frequently, the aggressor transceiver and the victim transceiver may use different clocks. In these circumstances, the NLIC architecture complexity may become prohibitive as it would require additional modules to compensate for time drift and/or frequency drift between aggressor and victim clocks, increasing the complexity of the design. As such, there is a need for a solution to more easily implement NLIC if the aggressor and victim baseband modules are not on the same chip or on the same die.

SUMMARY

Systems and methods are disclosed for implementing non-linear interference cancellation (NLIC) across chips or dies in communication systems to cancel or mitigate self-jamming interference. Self-jamming interference may arise when Tx leakage signal causes co-channel interference on the Rx signal due to non-linearities in the Tx or Rx chains of the communication systems. When the Tx and the Rx chains are implemented in separate chips or dies, cancellation or mitigation of the self-jamming interference is implemented across chips or dies. For example, a victim Rx chip implementing NLIC may be paired to an aggressor Tx chip of a FDD radio to cancel co-channel interference on the Rx signal due to Tx or Rx non-linearities. Similarly, a victim transceiver of a WiFi radio implementing NLIC may be paired to an aggressor transceiver of a 3GPP Long Term Evolution (LTE) radio to cancel co-channel interference on the Rx WiFi signal due to the harmonics on the LTE signal.

A method for NLIC by a victim receiver is disclosed. The method includes receiving an analog Tx signal from an aggressor transmitter. The method also includes receiving by a digital backend of the victim receiver a composite Rx signal from an Rx front-end of the victim receiver. The composite Rx signal includes a desired Rx signal and an interference signal, where the interference signal includes a non-linear distortion of a radio-frequency (RF) Tx signal. The method further includes generating a digital baseband Tx signal replica of the analog Tx signal, and generating a digitized composite Rx signal from the composite Rx signal. The method further includes determining an estimate of the interference signal from the digital baseband Tx signal replica. The method further includes removing the estimate of the interference signal from the digitized composite Rx signal.

A method for generating an auxiliary analog Tx signal from an aggressor transmitter for NLIC by a victim receiver is disclosed. The method includes receiving an analog Tx signal from a digital backend of the aggressor transmitter. The method also includes generating an RF Tx signal from the analog Tx signal. The method further includes generating an auxiliary analog Tx signal from the RF Tx signal. The method further includes providing the auxiliary analog Tx signal to the victim receiver for NLIC of a non-linear distortion of the RF Tx signal received by the victim receiver.

An apparatus for NLIC disclosed. The apparatus includes one or more ADCs, a memory, and one or more processors that execute instructions read from the memory. The processors execute the instructions to receive an analog Tx signal from an aggressor transmitter. The processors also execute the instructions to receive a composite Rx signal from an analog front-end of the apparatus. The composite Rx signal includes a desired Rx signal and an interference signal, where the interference signal includes a non-linear distortion of a radio-frequency (RF) Tx signal. The processors further execute the instructions to activate the ADCs to sample the analog Tx signal to generate a digital baseband Tx signal replica of the analog Tx signal, and to sample the composite Rx signal to generate a digitized composite Rx signal. The processors further execute the instructions to determine an estimate of the interference signal from the digital baseband Tx signal replica. The processors further execute the instructions to remove the estimate of the interference signal from the sampled composite Rx signal.

An apparatus to generate an analog Tx signal from the apparatus for NLIC by a victim receiver is disclosed. The apparatus includes a memory, and one or more processors that execute instructions read from the memory. The processors execute the instructions to receive an analog Tx signal from a digital backend of the apparatus. The processors also execute the instructions to generate an RF Tx signal from the analog Tx signal. The processors further execute the instructions to generate an auxiliary analog Tx signal from the RF Tx signal. The processors further execute the instructions to provide the auxiliary analog Tx signal to the victim receiver for NLIC of a non-linear distortion of the RF Tx signal received by the victim receiver.

A non-transitory machine-readable medium that stores machine-readable instructions is disclosed. One or more processors may execute the instructions to perform steps for NLIC. The instructions include receiving an analog Tx signal from an aggressor transmitter. The instructions also include receiving a composite Rx signal from an Rx analog front-end. The composite Rx signal includes a desired Rx signal and an interference signal, where the interference signal includes a non-linear distortion of a RF Tx signal. The instructions further include generating a digital baseband Tx signal replica of the analog Tx signal, and generating a digitized composite Rx signal from the composite Rx signal. The instructions further include determining an estimate of the interference signal using the digital baseband Tx signal replica. The instructions further include removing the estimate of the interference signal from the digitized composite Rx signal.

A non-transitory machine-readable medium that stores machine-readable instructions is disclosed. One or more processors may execute the instructions to perform steps for generating an auxiliary analog Tx signal for NLIC by a victim receiver. The instructions include receiving an analog Tx signal from a digital backend. The instructions also include generating an RF Tx signal from the analog Tx signal. The instructions further include generating the auxiliary analog Tx signal from the RF Tx signal. The instructions further include providing the auxiliary analog Tx signal to the victim receiver for NLIC of a non-linear distortion of the RF Tx signal received by the victim receiver.

A system for NLIC across chips or dies is disclosed. The system includes means for receiving an analog Tx signal from an aggressor transmitter. The system also includes means for receiving a composite Rx signal from an analog front-end of the system. The composite Rx signal includes a desired Rx signal and an interference signal, where the interference signal includes a non-linear distortion of a radio-frequency (RF) Tx signal. The system further includes means for generating a digital baseband Tx signal replica of the analog Tx signal, and means for generating a digitized composite Rx signal from the composite Rx signal. The system further includes means for determining an estimate of the interference signal using the digital baseband Tx signal replica. The system further includes means for removing the estimate of the interference signal from the digitized composite Rx signal.

A system to generate an analog Tx signal from the system for NLIC by a victim receiver is disclosed. The system includes means for receiving an analog Tx signal from a digital backend of the system. The system also includes mean for generating an RF Tx signal from the analog Tx signal. The system further includes means for generating an auxiliary analog Tx signal from the RF Tx signal. The system further includes means for providing the auxiliary analog Tx signal to the victim receiver for NLIC of a non-linear distortion of the RF Tx signal received by the victim receiver.

DETAILED DESCRIPTION

Figure 1:
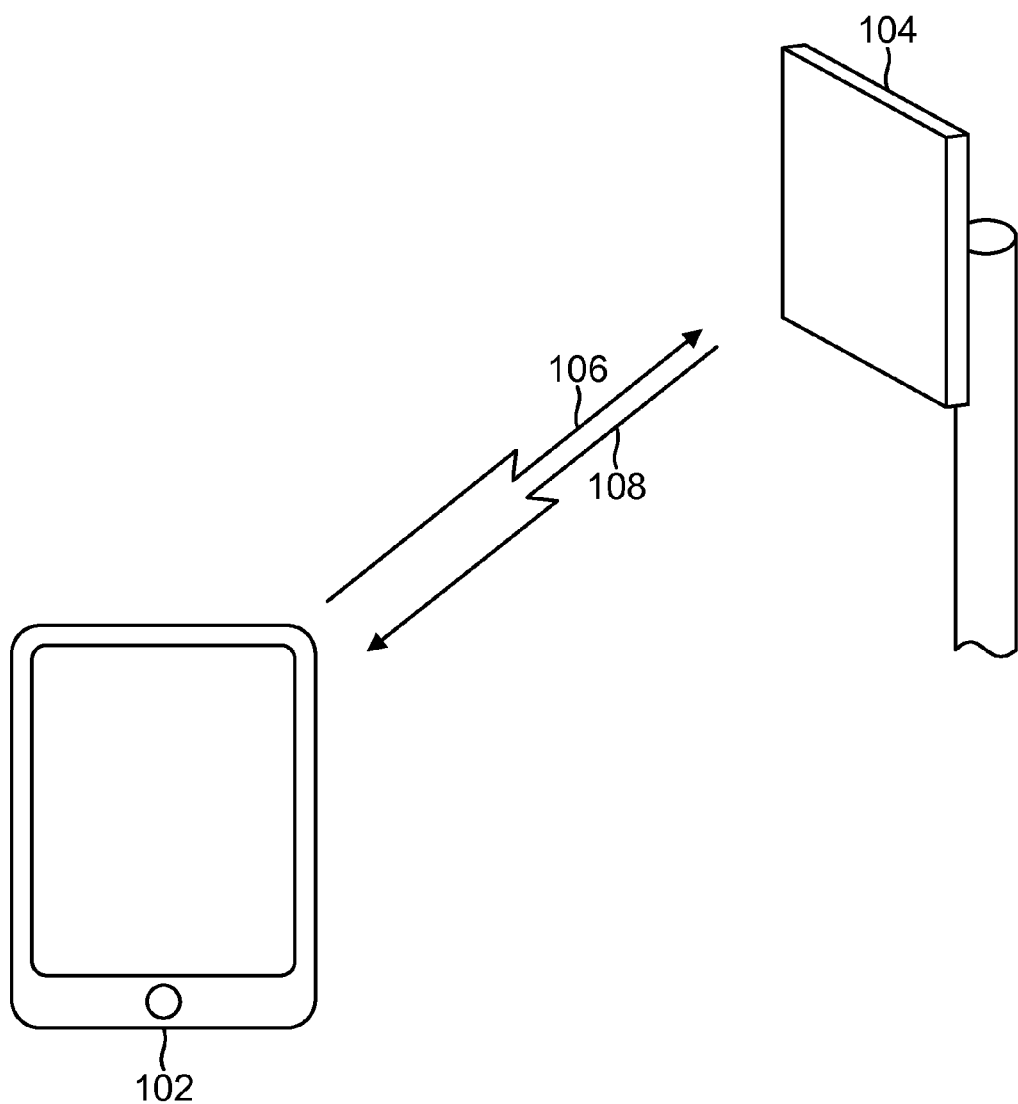
FIG. 1 shows two communication systems in a communication network in which non-linear interference cancellation across chips or dies may be implemented in the communication systems according to one or more embodiments of the present disclosure.

Systems and methods are disclosed to implement non-linear interference cancellation (NLIC) across chips or dies in communication systems to cancel or mitigate self-jamming interference. A communication system may include multiple transceivers operating in different frequency bands in which a Tx leakage signal from a first transceiver induces self-jamming interference on an Rx signal of a second transceiver. A communication system may also be an FDD transceiver in which the Tx leakage signal induces self-jamming interference on the Rx frequency band of the FDD transceiver. In these transceivers, the Tx chain generating the Tx leakage signal and the Rx chain receiving the self-jamming interference may be on different chips or dies. A die in the context of integrated circuits is a small block of semiconducting material, on which a given functional circuit is fabricated.

An aggressor transceiver of a communication system may include a digital backend that generates a Tx signal in baseband and an analog frontend that generates the Tx signal in RF from the baseband Tx signal. The RF Tx signal may leak to a victim transceiver of the communication system through finite isolation between the aggressor transceiver and the victim transceiver (e.g., duplexer, antenna coupling, circuit electromagnetic interference (EMI), ground coupling). The victim transceiver may include an analog frontend that receives a composite RF signal comprising the desired Rx signal in an Rx frequency band and the RF Tx leakage signal. Even though the RF Tx leakage signal may be in a different frequency band, non-linearities in the RF components of the analog frontend of the victim transceiver operating on the RF Tx leakage signal may generate co-channel interference in the Rx frequency band. For example, $2^{nd}$ order intermodulation (IM2) distortion of the RF Tx leakage signal in a RF down-converter of the victim transceiver may introduce interference to the desired RF signal. If there is an additional external narrowband jamming signal, cross modulation of the RF Tx leakage signal with the jamming signal in the RF down-converter may also cause interference. The interference signal may appear with the desired Rx signal in a composite baseband Rx signal from the output of the analog frontend. A digital backend of the victim transceiver may receive the composite baseband Rx signal to demodulate and decode the desired Rx signal. The interference signal reduces the signal to interference and noise ratio of the desired Rx signal, degrading performance of the victim transceiver, causing a decrease in throughput, and increasing the likelihood of dropped calls at the cell edge in cellular communication.

Self-jamming interference may also arise when non-linearities in the Tx RF components of the analog frontend of the aggressor transceiver generate spectral re-growth of the RF Tx signal that overlaps with the Rx frequency band. For example, a third harmonic distortion (H3D) of the Tx carrier signal $f_0$ from an RF up-converter of the aggressor transceiver may introduce spectral sideband at $3f_0$, which may fall in the Rx frequency band of the victim transceiver. The desired Rx signal and the interference signal in the Rx frequency band are down-converted by the analog frontend of the victim transceiver. The interference signal may appear with the desired Rx signal in a composite baseband signal from the output of the analog frontend. Similar to the interference from the IM2 distortion of the victim transceiver, the H3D interference may degrade the performance of the victim transceiver by causing a decrease in throughput and increasing the likelihood of dropped calls at the cell edge in cellular communication.

To cancel or mitigate the interference, the digital backend of the victim transceiver may receive the Tx signal from the aggressor transceiver as an analog baseband signal. The analog baseband Tx signal may be received from the digital backend or the analog frontend of the aggressor transceiver. In one or more embodiments, the analog baseband Tx signal may be tapped or spilled from a digital analog converter (DAC) of the digital backend of the aggressor transceiver. The same analog baseband Tx signal may go to the analog frontend of the aggressor transmitter to be up-converted to the RF Tx signal. In one or more embodiments, the analog frontend of the aggressor transceiver may down-convert the RF Tx signal to generate an auxiliary analog baseband signal using an auxiliary down-conversion and filtering stage. In this regard, the down-converted analog baseband Tx signal may include the self-jamming interference caused by the non-linearities in the Tx RF components of the analog frontend, e.g., the spectral re-growth from non-linearities in a power amplifier and/or switches of the aggressor transceiver. This spectral re-growth may include the close-in intermodulation interference at the Tx carrier frequency $f_0$.

The digital backend of the victim transceiver may receive the analog baseband Tx signal from the aggressor transceiver as well as the composite baseband Rx signal from the analog frontend of the victim transceiver. The composite baseband Rx signal includes the desired Rx signal and the interference signal. The digital backend of the victim transceiver may remove the interference signal by adaptively estimating the non-linear interference component in a NLIC module from a digital signal replica of the analog baseband Tx signal obtained at the victim transceiver as will be further detailed. To implement the NLIC, the digital backend may sample the analog baseband Tx signal using an analog digital converter (ADC), referred to as the baseband Tx ADC, to generate the digital signal replica of the analog baseband Tx signal. The baseband Tx ADC may be separate from a baseband Rx ADC used to sample the composite baseband Rx signal from the analog frontend to generate a digitized composite baseband Rx signal. The two ADCs may run on the same sampling clock so that the digital signal replica of the analog baseband Tx signal may be used by the NLIC module to estimate the non-linear interference signal that is sample aligned with the received interference component present in the digitized composite baseband Rx signal from which the estimated non-linear interference signal is to be removed. Advantageously, the digital backend of the victim transceiver does not need to run a frequency and/or time tracking loop to compensate for the frequency/time drift between the clocks in the aggressor transceiver and the victim transceiver. In addition, because the victim transceiver does not receive a digital baseband Tx signal replica that was digitized at a different clock frequency from the sampling clock in the victim transceiver, there is no need to re-sample the digital baseband TX signal replica to align the samples with the digitized composite baseband Rx signal.

The NLIC module may process the digital signal replica of the analog baseband Tx signal to generate an estimate of the non-linear interference component present in the digitized composite baseband Rx signal. The NLIC module may be a digital adaptive filter that applies a non-linear distortion to the digital signal replica of the analog baseband Tx signal to construct an estimate of the non-linear interference component. The digital backend may remove the estimate of the non-linear interference component from the digitized composite baseband Rx signal. The removal of the estimated non-linear interference component from the digitized composite baseband Rx signal may generate a residual interference signal. The residual interference signal may be minimized using a minimum square error (MSE) algorithm to generate an estimate of the non-linear interference component that closely approximates the received non-linear interference component present in the digitized composite baseband Rx signal.

FIG. 1 shows two communication systems in a communication network in which NLIC across chips or dies may be implemented in the communication systems according to one or more embodiments of the present disclosure. A user terminal 102 communicates with a base station 104 over a wireless network. User terminal 102 may be a smartphone, a tablet computer, a personal digital assistant (PDA), a notebook computer, a laptop, or other communication and/or computing devices. User terminal 102 may be stationary, portable, or mobile. User terminal 102 may also be referred to as a user equipment, a subscriber unit, a user node, a mobile station, or using other terminology. Base station 104 may be a base station in a cellular network, an access point (AP) in a WiFi network, or other stationary, portable, or mobile communication terminals. The wireless communication network over which user terminal 102 and base station 104 communicate may be a multiple access network, a point-to-point network, a mesh network, etc. Examples of multiple access networks may include Code Division Multiple Access (CDMA), Time Division Multiple Access (TDMA), Frequency Division Multiple Access (FDMA), Orthogonal Frequency Division Multiple Access (OFDMA), etc., that are found in cellular, wide-area network (WAN), local-area network (LAN), personal-area network (PAN), etc. Systems and methods for NLIC across chips or dies discussed here may also be applicable to GPS, UWB, RFID, or wired communication systems such as Ethernet, cable, fiber, power-line, etc.

User terminal 102 transmits data to base station 104 over an uplink 106. Base station 104 transmits data to user terminal 102 over a downlink 108. In an FDD system, uplink 106 and downlink 108 operate simultaneously over different frequency bands. Self-jamming interference in user terminal 102 may occur when non-linearities in the Tx path or Rx processing of user terminal 102 causes Tx frequency band of uplink 106 to interfere with the Rx frequency band of downlink 108. Similarly, self-jamming interference in base station 104 may occur when non-linearities in the Tx or Rx processing of base station 104 causes Tx frequency band of downlink 108 to interfere with the Rx frequency band of uplink 106.

Figure 2:
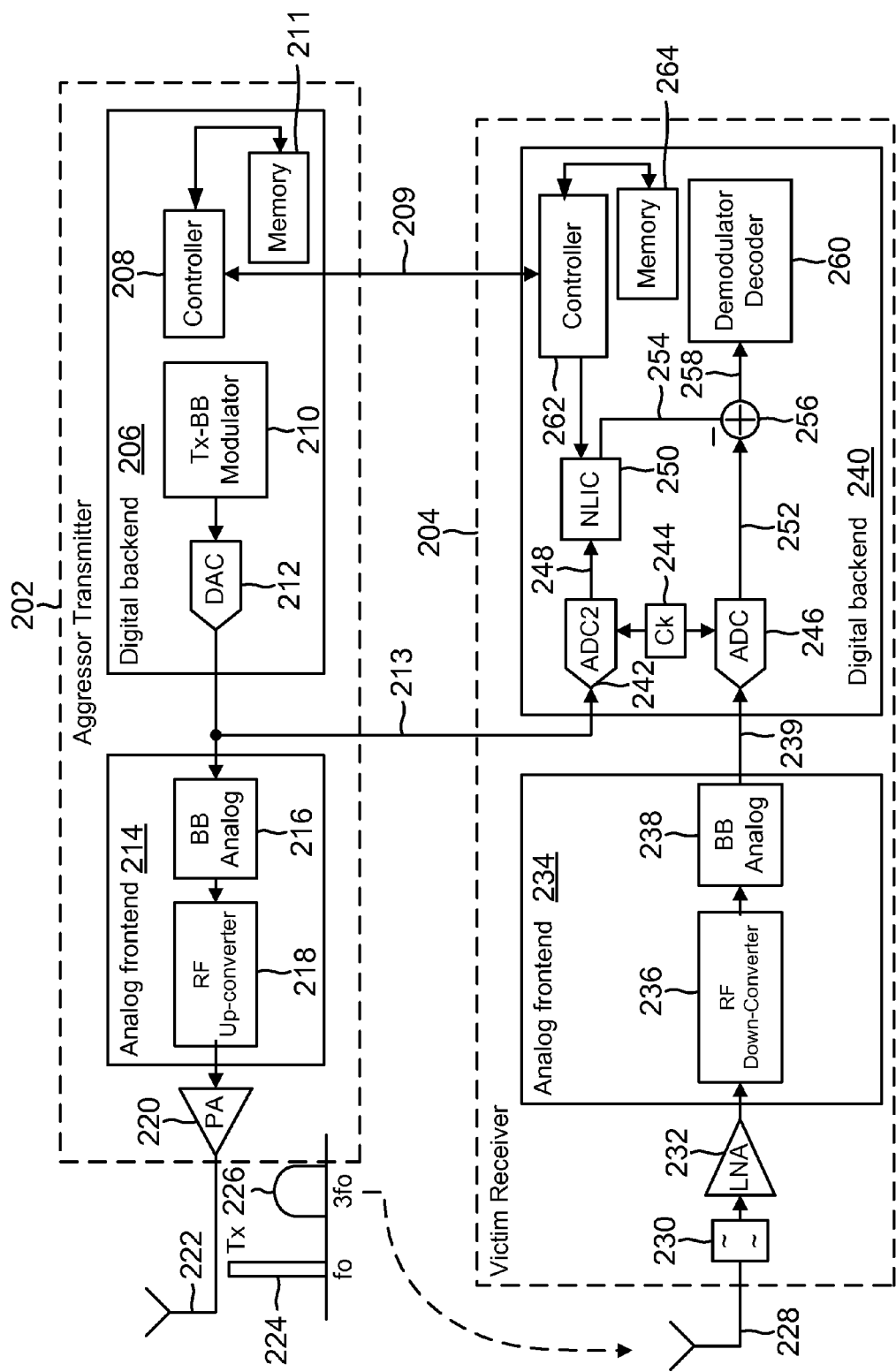
FIG. 2 shows a system block diagram of an aggressor transmitter and a victim receiver of a communication system in which an analog Tx signal is spilled from a digital-to-analog converter of an aggressor transmitter and is used by a victim receiver for NLIC according to one or more embodiments of the present disclosure.

FIG. 2 shows a system block diagram of an aggressor transmitter and a victim receiver of a communication system in which an analog Tx signal is spilled from a digital-to-analog converter of an aggressor transmitter and is used by a victim receiver for NLIC according to one or more embodiments of the present disclosure. The communication system of FIG. 2 may be found in user terminal 102 or base station 104 of FIG. 1.

The communication system includes an aggressor transmitter 202 and a victim receiver 204. Aggressor transmitter 202 and victim receiver 204 may be from the same transceiver of an FDD communication system or from different transceivers of a multi-radio communication system. Aggressor transmitter 202 includes a digital backend 206 and an analog frontend 214. Similarly, victim receiver 204 includes a digital backend 240 and an analog frontend 234. In one or more embodiments, digital backend 206 and analog frontend 214 of aggressor transmitter 202 may be implemented in the same chip or die. Similarly, digital backend 240 and analog frontend 234 of victim receiver 204 may be implemented in the same chip or die.

Digital backend 206 of aggressor transmitter 202 generates Tx data for up-conversion by analog frontend 214. Digital backend 206 includes a controller 208, a Tx baseband (Tx-BB) modulator 210, and a DAC 212. Tx-BB modulator 210 performs coding, interleaving, and modulation, etc., of data from one or more data sources to generate digital baseband Tx data under the control of controller 208. Controller 208 may execute instructions stored in a memory 211 to control the generation of the digital baseband Tx data. DAC 212 converts the digital baseband Tx data received from Tx-BB modulator 210 to an analog baseband Tx signal. In one or more embodiments, the analog signal from DAC 212 may be at an intermediate frequency (IF) if Tx-BB modulator 210 digitally up-converts the digital baseband Tx data to the IF.

The analog baseband Tx signal is routed as a signal 213 to digital backend 240 of victim receiver 204 for NLIC. Analog frontend 214 of aggressor transmitter 202 also receives the analog baseband Tx signal for up-conversion to an RF Tx signal. Analog frontend 214 includes a BB analog module 216 and an RF up-converter 218. BB analog module 216 filters, amplifies, and conditions the analog baseband Tx signal to generate a signal suitable for transmission over the communication channel. In one or more embodiments, BB analog module 216 may further condition the Tx signal for beamforming or for transmission over a multiple-input multiple-output (MIMO) channel. RF up-converter 218 up-converts the Tx signal from BB analog module 216 to the RF frequency band of the RF Tx signal. RF up-converter 218 may convert the Tx signal from baseband to the RF frequency band using a single-stage mixer or use a multi-stage up-conversion process involving several mixers and one or more IFs. The RF Tx signal may occupy the full bandwidth of the Tx channel or may only occupy one or more sub-bands of the Tx channel.

A power amplifier PA 220 amplifies the RF Tx signal from analog frontend 214 to a desired power level for transmission through an antenna 222. Operation of analog frontend 214 and PA 220 may also be under the control of controller 208. For example, controller 208 may determine the RF frequency band of the Tx channel, the sub-bands within the Tx channel, and the power level of the RF Tx signal.

Non-idealities in BB analog module 216, RF up-converter 218, and/or PA 220 generate spectral re-growth of the RF Tx signal that overlaps with the Rx frequency band received by victim receiver 204. For example, non-linearities in the amplifier or filter of BB analog module 216, in one or more mixers of RF up-converter 218, and/or in PA 220 may introduce spectral re-growth in the RF Tx signal. Linearities in PA 220 is a function of current consumption and the linear operating range of PA 220 may be traded off against power, area, and/or cost savings during design of aggressor transmitter 202. The result of the design trade-off may be to allow for some spectral re-growth when PA 220 is operated over the non-linear region. In one or more embodiments, if RF Tx signal 224 has a RF carrier frequency of $f_0$, the third harmonic distortion (H3D) of RF Tx signal 224 may introduce undesired energy at $3f_0$, which may fall in the Rx frequency band of RF Rx signal 226 received by victim receiver 204. Other $m^{th}$ harmonic distortions of RF Tx signal 224 may similarly introduce undesired energy at $m^{th}$ multiples of $f_0$, the cancellation of which also falls under the scope of the present disclosure.

Victim receiver 204 receives RF Rx signal 226 that is the desired Rx signal centered at Rx carrier frequency $f_{Rx}$ through antenna 228. Victim receiver 204 may receive self-jamming interference in the Rx frequency band due to the H3D of RF Tx signal 224 through antenna 228 or through limited isolation between aggressor transmitter 202 and victim receiver 204. Received RF Rx signal 226 is filtered by an external filter 230 (e.g., a duplexer, switch, or a surface acoustical wave (SAW) filter). The filtered Rx signal is amplified by a low noise amplifier (LNA) 232.

Analog frontend 234 of victim receiver 204 receives the filtered and amplified Rx signal from LNA 232. Analog frontend 234 includes an RF down-converter 236 and a BB analog module 238. RF down-converter 236 down-converts the Rx signal from the RF frequency band (e.g., Rx carrier frequency $f_{Rx}$ may be close to $3f_0$) down to baseband. RF down-converter 236 may down-convert the Rx signal from RF to baseband using a single-stage mixer or through a multi-stage down-conversion process involving several mixers and one or more IFs. BB analog module 238 filters, amplifies, conditions the baseband signal from RF down-converter 236, and outputs a composite baseband Rx signal 239 from analog frontend 234 for demodulation by digital backend 240. In one or more embodiments, analog frontend 234 may output the Rx signal at IF.

Non-idealities in the Rx signal processing chain may generate co-channel interference even if RF Tx signal 224 does not have spectral re-growth that overlaps with the Rx frequency band centered at $f_{Rx}$. For example, IM2 distortion of one or more mixers of RF down-converter 236 operating on leakage of RF Tx signal 224 may introduce interference component to composite baseband Rx signal 239. RF Tx signal 224 may leak to victim receiver 204 due to the large difference in signal power between RF Tx signal 224 and RF Rx signal 226 and due to limited isolation between aggressor transmitter 202 and victim receiver 204. Non-linearities in external filter 230, in LNA 232, and/or in the amplifier or filter of BB analog module 238 operating on the leakage of RF Tx signal 224 may also cause co-channel interference.

As such, composite baseband Rx signal 239 generated by analog frontend 234 is a composite signal that contains the desired Rx signal and an interference component. Digital backend 240 of victim receiver 204 receives composite baseband Rx signal 239 from analog frontend 234 and analog baseband Tx signal 213 from digital backend 206 of aggressor transmitter 202. Digital backend 240 samples composite baseband Rx signal 239 using an ADC 246 to generate a digitized composite baseband Rx signal 252. To implement NLIC across different chips or dies, digital backend 240 samples analog baseband Tx signal 213 using a second ADC, ADC2 242, to generate a digital signal replica of analog baseband Tx signal 248. ADC 246 and ADC2 242 run on sampling clocks generated by a clock module 244. The two ADCs may run on a common sampling clock so that digital signal replica of analog baseband Tx signal 248 may be used in a NLIC module to estimate the non-linear interference signal that is sample aligned with the received non-linear interference component present in digitized composite baseband Rx signal replica 252.

An NLIC module 250 processes digital signal replica of analog baseband Tx signal 248 to generate an estimate of the non-linear interference component present in digitized composite baseband Rx signal 252 under the control of a controller 262. NLIC module 250 may be a digital adaptive filter that applies a non-linear distortion to digital signal replica of analog baseband Tx signal 248 to construct an estimated interference signal 254. In one or more embodiments, NLIC module 250 may be a non-linear filter that constructs estimated interference signal 254 to represent a sum of an estimate of the H3D interference from RF Tx signal 224, of an estimate of the IM2 interference from the RF processing of victim receiver 204, and of estimates of other distortions induced by the leakage of RF Tx signal 224. A summer 256 subtracts estimated interference signal 254 from digitized composite baseband Rx signal 252 to cancel or mitigate the non-linear interference component present in digitized composite baseband Rx signal 252. Summer 256 generates a post-cancellation signal 258 as a representation of the desired Rx signal Summer 256 may also generate an error signal to represent a residual of the non-linear interference component after NLIC. NLIC module 250 may minimize the error signal using a minimum square error (MSE) algorithm to adaptively generate estimated interference signal 254 that closely approximates the non-linear interference component present in digitized composite baseband Rx signal 252.

A demodulator—decoder module 260 demodulates, de-interleaves, and decodes post-cancellation signal 258 to recover Tx data received in RF Rx signal 226 under the control of controller 262. Controller 262 may execute instructions stored in a memory 264 to configure demodulator-decoder module 260 with Tx parameters such as the coding scheme, coding rate, modulation scheme, etc., used by Tx-BB modulator 210 of aggressor transmitter 202 to generate the Tx data. Such Tx parameters may be communicated by controller 208 of aggressor transmitter 202 to controller 262 of victim receiver 204 via a data interface.

Aggressor transmitter 202 may also communicate Tx information 209 on its Tx operation to victim receiver 204 to aid the NLIC. For example, controller 208 of aggressor transmitter 202 may communicate Tx information 209 pertaining to the Tx carrier frequency (e.g., $f_0$), transmit power, Tx sub-bands used, configuration information of analog frontend 214 of aggressor transmitter 202, etc., to controller 262 of victim receiver 204 via the data interface. Digital backend 240 of victim receiver 204 may use Tx information 209 to enable NLIC module 250. For example, controller 262 may enable NLIC module 250 for cancellation of IM2 interference if it determines from the Tx sub-band information, the Tx carrier frequency, the Tx power, and knowledge of the frequency of a local oscillator (LO) of RF down-converter module 236 of victim receiver 204 that non-linearities in RF down-converter module 236 operating on the leakage of RF Tx signal 224 may cause co-channel interference on the Rx frequency band of RF Rx signal 226. In one or more embodiments, controller 262 may enable NLIC module 250 for cancellation of H3D interference if it determines from the Tx sub-band information and the Tx carrier frequency that the third harmonics of RF Tx signal 224 may overlap with the Rx frequency band of RF Rx signal 226. In one or more embodiments, controller 262 may fine tune the MSE algorithm of NLIC module 250 based on Tx information 209. For example, controller 262 may initialize the MSE algorithm of NLIC module 250 for faster convergence of estimated interference signal 254 to the non-linear interference component present in digitized composite baseband Rx signal 252 using Tx information 209. The data interface between aggressor transmitter 202 and victim receiver 204 may be a standardized interface such as the WCI-2 interface.

Figure 3:
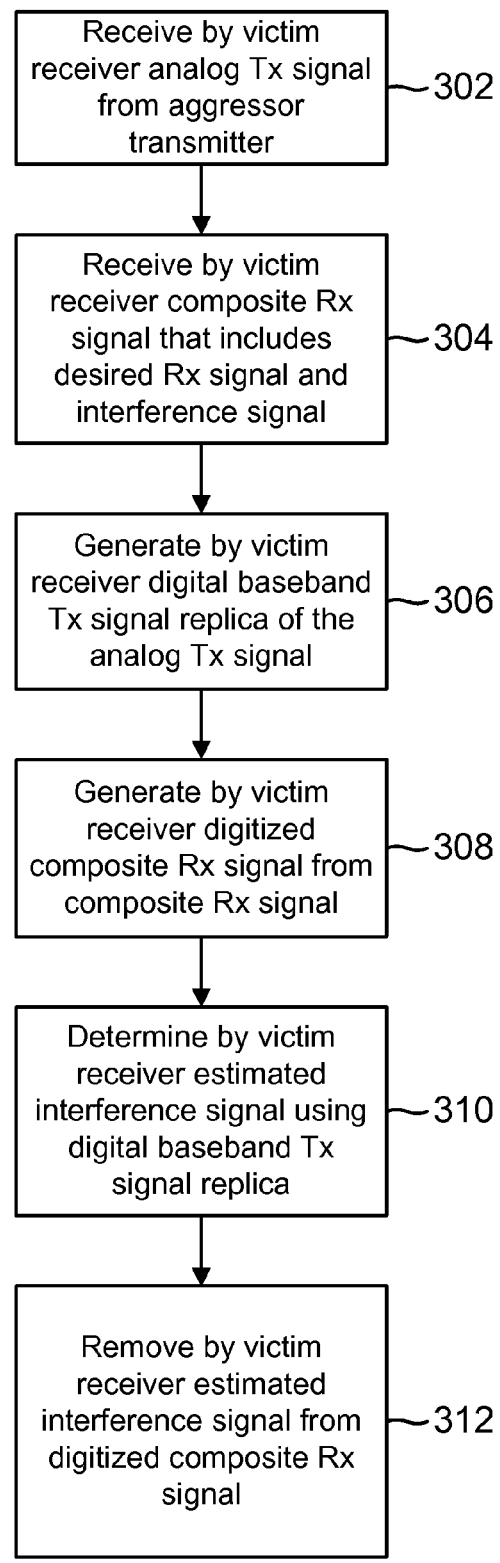
FIG. 3 shows a flow chart for non-linear interference cancellation across an aggressor transmitter and a victim receiver of a communication system according to one or more embodiments of the present disclosure.

FIG. 3 shows a flow chart for NLIC across an aggressor transmitter and a victim receiver of a communication system according to one or more embodiments of the present disclosure. For example, the processing steps of FIG. 3 may be practiced by digital backend 240 of victim receiver 204 of FIG. 2 for NLIC of self-jamming interference from aggressor transmitter 202.

In 302, the victim receiver receives an analog Tx signal from the aggressor transmitter. The analog Tx signal may be a baseband signal that will be up-converted to the RF frequency band of the Tx channel. For example, the analog Tx signal may be analog baseband Tx signal 213 output by DAC 212 as shown in FIG. 2. Digital backend 240 of victim receiver 204 may receive analog baseband Tx signal 213 from digital backend 206 of aggressor transmitter 202. In one or more embodiments, the analog Tx signal may be at an IF.

In 304, the victim receiver receives an analog composite Rx signal that includes the desired Rx signal and the interference signal. The interference signal may be self-jamming interference from non-linearities in the Tx RF components of the aggressor transmitter, such as H3D of the RF Tx signal that falls into the Rx frequency band. In one or more embodiments, the interference signal may be co-channel interference from non-linearities in the RF components of the victim receiver operating on leakage of the RF Tx signal from the aggressor transmitter. The analog composite Rx signal may be a baseband signal. For example, the analog composite Rx signal may be composite baseband Rx signal 239 from BB analog module 238. Digital backend 240 of victim receiver 204 may receive composite baseband Rx signal 239 from analog frontend 234 of victim receiver 204. In one or more embodiments, the analog composite Rx signal may be at the same IF as the analog Tx signal.

In 306, the victim receiver generates a digital signal replica of the analog Tx signal. The victim receiver may sample the analog Tx signal at a sufficient sampling rate to replicate the digital baseband Tx signal as transmitted by the aggressor transmitter. For example, digital backend 240 of victim receiver 204 may sample analog baseband Tx signal 213 using ADC2 242 to replicate analog baseband Tx signal 213 in a digital form (i.e., generating digital signal replica of analog baseband Tx signal 248).

In 308, the victim receiver generates a digitized composite Rx signal. The victim receiver may sample the composite Rx signal at the same sampling rate as that used to sample the analog Tx signal. For example, digital backend 240 of victim receiver 204 may generate digitized composite baseband Rx signal 252 by using ADC 246 to sample composite baseband Rx signal 239 at the same sampling rate as that used by ADC2 242 in sampling analog baseband Tx signal 213. By sampling composite baseband Rx signal 239 and analog baseband Tx signal 213 at the same sampling rate, digital signal replica of analog baseband Tx signal 248 may be processed by NLIC module 250 to generate an estimate of the interference signal (i.e., estimated interference signal 254) that is sample-aligned with the received non-linear interference component present in digitized composite baseband Rx signal 252. In one embodiment, NLIC module 250 may sample align estimated interference signal 254 and the received non-linear interference component present in digitized composite baseband Rx signal 252 by inserting adjustable delays in NLIC module 250 to compensate for the difference in path delays between analog baseband Tx signal 213 received from aggressor transmitter 202 and composite baseband Rx signal 239 received from analog frontend 234 of victim receiver 204.

In 310, the victim receiver determines an estimate of the interference signal from the digital signal replica of the analog Tx signal. The victim receiver may use the NLIC module to adaptively apply a non-linear distortion to the digital signal replica of the analog Tx signal to generate the estimated interference signal. For example, NLIC module 250 of digital backend 240 may process digital signal replica of analog baseband Tx signal 248 to generate estimated interference signal 254. NLIC module 250 may use a MSE algorithm to adaptively generate estimated interference signal 254 to minimize an error signal. The error signal may represent a residual of the non-linear interference component after NLIC as determined from the difference between estimated interference signal 254 and the received non-linear interference component present in digitized composite baseband Rx signal 252.

In 312, the victim receiver removes the estimated interference signal from the digitized composite Rx signal to cancel or mitigate the interference component present in the digitized composite Rx signal. For example, summer 256 of digital backend 240 may subtract estimated interference signal 254 from digitized composite baseband Rx signal 252 to generate post-cancellation signal 258 to approximate the desired Rx signal. The victim receiver may demodulate the interference-mitigated digitized composite Rx signal to recover the desired Rx data. For example, demodulator decoder 260 may demodulate post-cancellation signal 258 to receive the desired Rx data.

Figure 4:
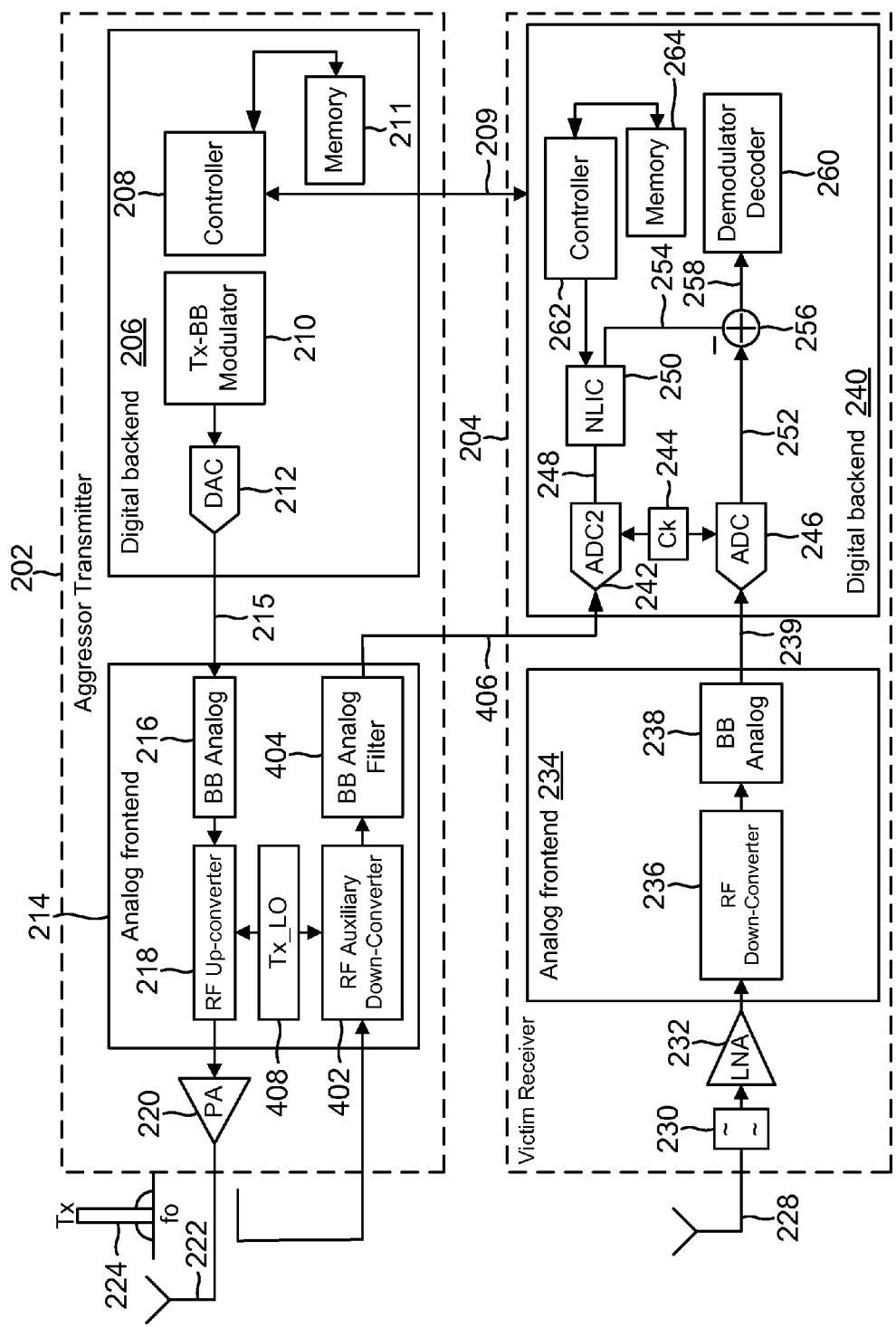
FIG. 4 shows a system block diagram of an aggressor transmitter and a victim receiver of a communication system in which an analog baseband Tx signal down-converted from the RF Tx signal of the aggressor transmitter is used by the victim receiver for non-linear interference cancellation according to one or more embodiments of the present disclosure.

FIG. 4 shows a system block diagram of an aggressor transmitter and a victim receiver of a communication system in which an analog baseband Tx signal down-converted from the RF Tx signal of the aggressor transmitter is used by a victim receiver for NLIC according to one or more embodiments of the present disclosure. FIG. 4 differs from FIG. 2 in how the analog baseband Tx signal is generated. In FIG. 2, the analog baseband Tx signal is tapped from DAC 212 of digital backend 206. However, there may be situations when DAC 212 is not readily accessible, or it may be undesirable to tap DAC 212 because loading and/or impedance mismatch on the output of DAC 212 may introduce noise or otherwise degrade the signal integrity of the analog baseband Tx signal. FIG. 4 shows an alternative embodiment in which analog frontend 214 down-converts the RF Tx signal to generate the analog baseband Tx signal. To distinguish between the analog baseband Tx signal generated by digital backend 206 of aggressor transmitter 202 from the analog baseband Tx signal generated by analog frontend 214, the analog baseband Tx signal down-converted from the RF Tx signal by analog frontend 214 is referred to as the auxiliary analog baseband Tx signal.

Operations of digital backend 206 of aggressor transmitter 202 of FIG. 4 may be the same as that described in the discussion for FIG. 2 and so is not repeated. Analog frontend 214 receives an analog baseband Tx signal 215 from digital backend 206. Analog baseband Tx signal 215 is tapped from the same DAC (i.e., DAC 212) as analog baseband Tx signal 213 of FIG. 2. Analog frontend 214 up-converts analog baseband Tx signal 215 to generate RF Tx signal 224 as in FIG. 2. RF Tx signal 224 has a RF carrier frequency of $f_0$. A coupler may sense RF Tx signal 224 at the output of PA 220. When sensed, RF Tx signal 224 is routed back to analog frontend 214 in addition to being transmitted through antenna 222. An RF auxiliary down-converter 402 down-converts RF Tx signal 224 from the RF carrier frequency (e.g., $f_0$) down to baseband. RF auxiliary down-converter 402 may use a single-stage mixer or may use a multi-stage down-conversion process involving several mixers to perform the down-conversion. RF auxiliary down-converter 402 and RF up-converter 218 may share a Tx_LO module 408 that provides one or more LOs for the one or more mixers. A BB analog filter 404 filters, amplifies, and/or conditions the baseband signal from RF auxiliary down-converter 402 and outputs an auxiliary analog baseband Tx signal 406. Digital backend 240 of victim receiver 204 receives auxiliary analog baseband Tx signal 406 from analog frontend 214 of aggressor transmitter 202. In one or more embodiments, auxiliary analog baseband Tx signal 406 may be at an IF, such as when RF auxiliary down-converter 402 down-converts RF Tx signal 224 to IF. Operations of the RF processing of the RF Rx signal received at antenna 228 at victim receiver 204 to generate composite baseband Rx signal 239 may be the same as that described in the discussion for FIG. 2. Similarly, operations of processing auxiliary analog baseband Tx signal 406 and composite baseband Rx signal 239 for NLIC may be the same as that described in the discussion for FIG. 2. These discussions are not repeated for brevity.

RF auxiliary down-converter 402 and BB analog filter 404 may be existing modules used for other functionalities. Controller 208 may manage the time sharing of RF auxiliary down-converter 402 and BB analog filter 404 with the other functionalities. As such, analog frontend 214 may down-convert RF Tx signal 224 to generate auxiliary analog baseband Tx signal 406 without incurring a penalty in area or cost. Advantageously, because auxiliary analog baseband Tx signal 406 is down-converted from RF Tx signal 224 that is generated by the RF components in analog frontend 214, auxiliary analog baseband Tx signal 406 may include the self-jamming interference caused by the non-linearities in the Tx RF components of analog frontend 214. For example, auxiliary analog baseband Tx signal 406 may include the interference from H3D of RF Tx signal 224 caused by non-linearities in BB analog module 216, RF up-converter 218, and/or PA 220 of aggressor transmitter 202. The presence of the H3D interference in auxiliary analog baseband Tx signal 406 received by digital backend 240 of victim receiver 204 may eliminate the need for NLIC module 250 to estimate the H3D interference. Estimated interference signal 254 may contain an accurate replica of the H3D interference that may be removed from digitized composite baseband Rx signal 252 to cancel or mitigate the H3D interference.

Figure 5:
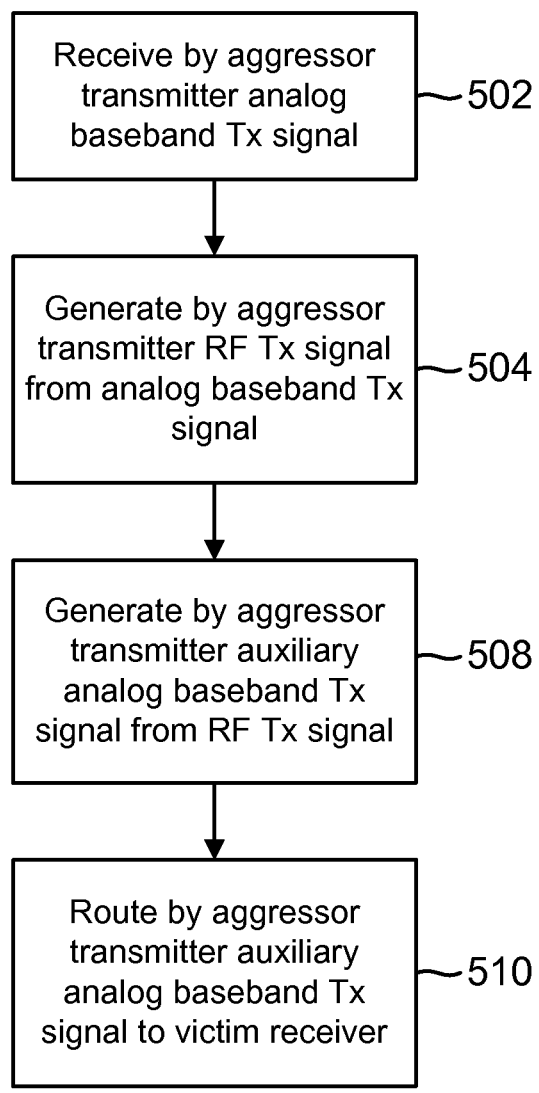
FIG. 5 shows a flow chart for the aggressor transmitter of FIG. 4 to generate the auxiliary analog baseband Tx signal from the RF Tx signal according to one or more embodiments of the present disclosure; and Embodiments of the present disclosure and their advantages are best understood by referring to the detailed description that follows. It should be appreciated that like reference numerals are used to identify like elements illustrated in one or more of the figures.

FIG. 5 shows a flow chart for the aggressor transmitter of FIG. 4 to generate the auxiliary analog baseband Tx signal from the RF Tx signal according to one or more embodiments of the present disclosure. For example, the processing steps of FIG. 5 may be practiced by analog frontend 214 of aggressor transmitter 202 of FIG. 4 to generate auxiliary analog baseband Tx signal 406.

In 502, the aggressor transmitter receives an analog baseband Tx signal. The analog baseband Tx signal may be up-converted to the RF frequency of the Tx channel. For example, analog baseband Tx signal 215 may be received by analog frontend 214 from DAC 212 of digital backend 206 of aggressor transmitter 202. In one or more embodiments, analog baseband Tx signal 215 may be at an IF.

In 504, the aggressor transmitter generates the RF Tx signal from the analog baseband Tx signal. The RF Tx signal has a RF carrier frequency of the Tx channel. For example, aggressor transmitter 202 may process analog baseband Tx signal 215 through BB analog module 216 and RF up-converter 218 to generate an RF Tx signal from analog frontend 214. PA 220 may amplify the RF Tx signal from analog frontend 214 to the desired transmit power level to generate RF Tx signal 224. RF Tx signal 224 may have a carrier frequency of $f_0$.

The aggressor transmitter may transmit the RF Tx signal through the antenna. The aggressor transmitter may sense the RF Tx signal to enable the down-conversion of the RF Tx signal. For example, aggressor transmitter 202 may transmit RF Tx signal 224 through antenna 222. In addition, a coupler may sense RF Tx signal 224 at the output of PA 220 to route RF Tx signal 224 back to analog frontend 214 for down-conversion.

In 508, the aggressor transmitter generates the auxiliary analog baseband Tx signal from the RF Tx signal. For example, RF auxiliary down-converter 402 of analog frontend 214 may down-convert RF Tx signal 224 from a carrier frequency of $f_0$ to baseband. BB analog filter 404 of analog frontend 214 may filter, amplify, and/or condition the baseband signal from RF auxiliary down-converter 402 to generate auxiliary analog baseband Tx signal 406 that may be provided to victim receiver 204 for NLIC operation. In one or more embodiments, the aggressor transmitter may down-convert the RF Tx signal to IF.

In 510, the aggressor transmitter routes the auxiliary analog baseband Tx signal to the victim receiver for the victim receiver to implement NLIC operation to cancel or mitigate the interference on the RF Rx signal. For example, digital backend 240 of victim receiver 204 receives auxiliary analog baseband Tx signal 406 from analog frontend 214 of aggressor transmitter 202 for NLIC processing.

It is contemplated that the methods identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It is also contemplated that various embodiments provided by the present disclosure may be implemented using hardware, firmware, software, or any combinations thereof. For example, the various modules of the analog frontends or the digital backends of FIG. 2 or 4 may be implemented by one or more processors, including but not limited to, controller 208, controller 262, and/or other processing components internal or external to the aggressor transmitter or victim receiver. The processors may include a micro-controller, digital signal processor (DSP), or other processing components. The processors may perform specific operations by executing one or more sequences of instructions contained in system memory. Logic may be encoded in a computer readable medium, which may refer to any medium that participates in providing instructions to processors for execution. Such a medium may take many forms, including but not limited to, non-volatile media, volatile media, and transmission media. In one embodiment, logic is encoded in non-transitory computer readable medium. Any combination of one or more non-transitory computer readable medium(s) may be utilized. Non-transitory computer-readable media comprise all computer readable media, with the sole exception being a transitory, propagating signal.

Although embodiments of the present disclosure have been described, these embodiments illustrate but do not limit the disclosure. For example, although NLIC operation across chips or dies was discussed with respect to IM2 and H3D interference, embodiments of the present disclosure may encompass NLIC operation between an aggressor transmitter and a victim receiver that are implemented on the same chip or die. In addition, embodiments of the present disclosure may encompass other types of self-jamming interference introduced by the Tx and/or Rx chains (e.g., other harmonics of the RF Tx signal, higher orders of intermodulation interference, or cross modulation of the RF Tx with other Tx frequencies or jammers). It should also be understood that embodiments of the present disclosure should not be limited to these embodiments but that numerous modifications and variations may be made by one of ordinary skill in the art in accordance with the principles of the present disclosure and be included within the scope of the present disclosure as hereinafter claimed.

What is claimed is:

1. A method for non-linear interference cancellation (NLIC), the method comprising:
   receiving, at a receiver of a device, transmit information and an analog baseband signal from a transmitter of the device, wherein the transmitter and the receiver are on different integrated circuits of the device, and wherein the analog baseband signal and the transmit information are received via an interface between the different integrated circuits;
   receiving, via an antenna of the receiver, a receive (Rx) signal that includes received interference from the transmitter;
   determining an estimated interference based, at least in part, on the analog baseband signal and the transmit information from the transmitter; and
   removing the estimated interference from the Rx signal.

2. The method of claim 1,
   wherein determining the estimated interference comprises:
      converting the analog baseband signal to a digital baseband signal replica of the analog baseband signal, and
      determining the estimated interference based, at least in part, on the digital baseband signal replica; and
   wherein removing the estimated interference comprises:
      converting the Rx signal to a digitized Rx signal, and
      removing the estimated interference from the digitized Rx signal.

3. The method of claim 2, wherein said converting the analog baseband signal to the digital baseband signal replica comprises sampling the analog baseband signal.

4. The method of claim 2, wherein said converting the Rx signal to the digitized Rx signal comprises sampling the Rx signal.

5. The method of claim 2, further comprising using a same sampling clock for converting the analog baseband signal and converting the Rx signal.

6. The method of claim 2, wherein said determining the estimated interference comprises performing an adaptive non-linear filtering operation on the digital baseband signal replica to construct the estimated interference.

7. The method of claim 1, wherein receiving the analog baseband signal from the transmitter comprises tapping the analog baseband signal from the transmitter prior to the analog baseband signal being up-converted to a radio frequency (RF) transmit signal by the transmitter.

8. The method of claim 1, wherein the analog baseband signal comprises an auxiliary analog baseband signal that is generated from the transmitter down-converting a radio frequency (RF) transmit signal of the transmitter to the auxiliary analog baseband signal.

9. The method of claim 1, wherein the transmit information comprises at least one member from a group consisting of a transmit carrier frequency, a transmit power, transmit sub-bands, and configuration information about an analog frontend of the transmitter.

10. The method of claim 1, wherein receiving the analog baseband signal comprises a digital backend of the receiver receiving the analog baseband signal from an analog frontend of the transmitter.

11. The method of claim 1, wherein the received interference comprises intermodulation distortion of a radio frequency signal received from the transmitter, the intermodulation distortion due to non-linearities in an analog frontend of the receiver, wherein the radio frequency signal received from the transmitter is associated with the analog baseband signal received from the transmitter.

12. An apparatus, comprising:
a receiver;
a processor; and
a memory having instructions which, when executed by the processor, cause the apparatus to:
receive transmit information and an analog baseband signal from a transmitter of the apparatus, wherein the transmitter and the receiver are on different integrated circuits of the apparatus, and wherein the analog baseband signal and the transmit information are received via an interface between the different integrated circuits;
receive, via an antenna of the receiver, a receive (Rx) signal that includes received interference from the transmitter;
determine an estimated interference based, at least in part, on the analog baseband signal and the transmit information from the transmitter; and
remove the estimated interference from the Rx signal.

13. The apparatus of claim 12,
wherein the instructions that cause the apparatus to determine the estimated interference comprise instructions that cause the apparatus to:
convert the analog baseband signal to a digital baseband signal replica of the analog baseband signal, and
determine the estimated interference based, at least in part, on the digital baseband signal replica; and
wherein the instructions that cause the apparatus to remove the estimated interference comprise instructions that cause the apparatus to:
convert the Rx signal to a digitized Rx signal, and
remove the estimated interference from the digitized Rx signal.

14. The apparatus of claim 13,
wherein the instructions that cause the apparatus to convert the analog baseband signal to the digital baseband signal replica includes instructions that cause the apparatus to sample the analog baseband signal,
wherein the instructions that cause the apparatus to convert the Rx signal to the digitized Rx signal include instructions that cause the apparatus to sample the RX signal, and
wherein a same sampling clock is used for sampling the analog baseband signal and sampling the Rx signal.

15. The apparatus of claim 13, wherein the instructions that cause the apparatus to determine the estimated interference include instructions that cause the apparatus to perform an adaptive non-linear filtering operation on the digital baseband signal replica to construct the estimated interference.

16. The apparatus of claim 13, wherein the received interference comprises intermodulation distortion of a radio frequency signal received from the transmitter, the intermodulation distortion due to non-linearities in an analog frontend of the receiver, wherein the radio frequency signal received from the transmitter is associated with the analog baseband signal received from the transmitter.

17. The apparatus of claim 12, wherein the analog baseband signal is tapped from the transmitter prior to being up-converted to a radio frequency (RF) transmit signal by the transmitter.

18. The apparatus of claim 12, wherein the analog baseband signal comprises an auxiliary analog baseband signal that is generated from the transmitter down-converting a radio frequency (RF) transmit signal of the transmitter to the auxiliary analog baseband signal.

19. The apparatus of claim 12, wherein the transmit information comprises at least one member from a group consisting of a transmit carrier frequency, a transmit power, transmit sub-bands, and configuration information about an analog front end of the transmitter.

20. The apparatus of claim 12, wherein the instructions to receive the analog baseband signal comprises instructions for a digital backend of the receiver to receive the analog baseband signal from an analog frontend of the transmitter.

21. A non-transitory machine-readable medium comprising a plurality of machine-readable instructions which, when executed by a processor, cause the processor to perform operations for non-linear interference cancellation (NLIC) comprising:
receiving, at a receiver of a device, transmit information and an analog baseband signal from a transmitter of the device, wherein the transmitter and the receiver are on different integrated circuits of the device, and wherein the analog baseband signal and the transmit information are received via an interface between the different integrated circuits;
receiving, via an antenna of the receiver, a receive (Rx) signal that includes received interference from the transmitter;
determining an estimated interference based, at least in part, on the analog baseband signal and the transmit information; and
removing the estimated interference from the Rx signal.

22. The non-transitory machine-readable medium of claim 21,
wherein determining the estimated interference comprises:
converting the analog baseband signal to a digital baseband signal replica of the analog baseband signal, and
determining the estimated interference based, at least in part, on the digital baseband signal replica; and wherein removing the estimated interference comprises:
   converting the Rx signal to a digitized Rx signal, and
   removing the estimated interference from the digitized Rx signal.

23. The non-transitory machine-readable medium of claim 22, wherein said converting the analog baseband signal to the digital baseband signal replica comprises sampling the analog baseband signal.

24. The non-transitory machine-readable medium of claim 22, wherein said converting the Rx signal to the digitized Rx signal comprises sampling the Rx signal.

25. The non-transitory machine-readable medium of claim 22, wherein a same sampling clock is used for converting the analog baseband signal and converting the Rx signal.

26. The non-transitory machine-readable medium of claim 22, wherein said determining the estimated interference comprises performing an adaptive non-linear filtering operation on the digital baseband signal replica to construct the estimated interference.

27. The non-transitory machine-readable medium of claim 21, wherein the analog baseband signal is tapped from the transmitter prior to being up-converted by the transmitter to a radio frequency (RF) transmit signal.

28. The non-transitory machine-readable medium of claim 21, wherein the analog baseband signal comprises an auxiliary analog baseband signal that is generated the transmitter down-converting a radio frequency (RF) transmit signal of the transmitter to the auxiliary analog baseband signal.

29. A system, comprising:
   means for receiving, at a receiver of a device, transmit information and an analog baseband signal from a transmitter of the device, wherein the transmitter and the receiver are on different integrated circuits of the device, and wherein the analog baseband signal and the transmit information are received via an interface between the different integrated circuits;
   means for receiving, via an antenna of the receiver, a receive (Rx) signal that includes received interference from the transmitter;
   means for determining an estimated interference based, at least in part, on the analog baseband signal and the transmit information; and
   means for removing the estimated interference from the Rx signal.

30. The system of claim 29,
   wherein said means for determining the estimated interference comprises:
      means for converting the analog baseband signal to a digital baseband signal replica of the analog baseband signal, and
      means for determining the estimated interference based, at least in part, on the digital baseband signal replica; and
   wherein said means for removing the estimated interference comprises:
      means for converting the Rx signal to a digitized Rx signal, and
      means for removing the estimated interference from the digitized Rx signal.

31. The system of claim 30, wherein the means for converting the analog baseband signal to the digital baseband signal replica comprises means for sampling the analog baseband signal.

32. The system of claim 30, wherein the means for converting the Rx signal to the digitized Rx signal comprises means for sampling the Rx signal.

33. The system of claim 30, wherein the means for converting the analog baseband signal and the means for converting the Rx signal both use a same sampling clock.

34. The system of claim 30, wherein the means for determining the estimated interference comprises means for performing an adaptive non-linear filtering operation on the digital baseband signal replica to construct the estimated interference.

35. A method for supporting non-linear interference cancellation (NLIC), the method comprising:
   transmitting, from a transmitter of a device, a radio-frequency (RF) transmit signal, wherein the RF transmit signal causes non-linear interference to a received signal at a receiver of the device;
   generating an auxiliary analog baseband signal based, at least in part, on the RF transmit signal; and
   providing transmit information and the auxiliary analog baseband signal to the receiver for use by the receiver to remove the non-linear interference caused by the RF transmit signal, wherein the transmitter and the receiver are on different integrated circuits of the device, and wherein the auxiliary analog baseband signal and the transmit information are provided via an interface between the different integrated circuits.

36. The method of claim 35, wherein transmitting the RF transmit signal comprises:
   receiving an original analog baseband signal from a digital backend of the transmitter; and
   generating the RF transmit signal based, at least in part, on the original analog baseband signal.

37. The method of claim 35, wherein said generating the auxiliary analog baseband signal from the RF transmit signal comprises down-converting the RF transmit signal.

38. The method of claim 35, wherein said transmitting the RF transmit signal induces non-linear distortion at one or more harmonics of the RF transmit signal.

39. The method of claim 35,
   wherein the transmit information comprises at least one member from a group consisting of a transmit carrier frequency, a transmit power, transmit sub-bands, and configuration information about an analog front end of the transmitter.

40. An apparatus, comprising:
   a processor; and
   a memory having instructions which, when executed by the processor, cause the apparatus to:
      transmit, at a transmitter of the apparatus, a radio-frequency (RF) transmit signal, wherein the RF transmit signal causes non-linear interference to a received signal at a receiver of the apparatus;
      generate an auxiliary analog baseband signal based, at least in part, on the RF transmit signal; and
      provide transmit information and the auxiliary analog baseband signal to the receiver for use by the receiver to remove the non-linear interference associated with the RF transmit signal, wherein the transmitter and the receiver are on different integrated circuits of the apparatus, and wherein the auxiliary analog baseband signal and the transmit information are provided via an interface between the different integrated circuits.

41. The apparatus of claim 40, wherein instructions to cause the apparatus to transmit the RF transmit signal include instructions to cause the apparatus to:
   receive an original analog baseband signal from a digital backend of the transmitter; and
   generate the RF transmit signal based, at least in part, on the original analog baseband signal.

42. The apparatus of claim 40, wherein the instructions that cause the apparatus to generate the auxiliary analog baseband signal from the RF transmit signal comprises instructions to down-convert the RF transmit signal.

43. The apparatus of claim 40, wherein transmission of the RF transmit signal induces non-linear distortion at one or more harmonics of the RF transmit signal.

44. A non-transitory machine-readable medium comprising a plurality of machine-readable instructions which, when executed by a processor of an apparatus, cause the apparatus to perform operations for non-linear interference cancellation (NLIC) comprising:

transmitting, at a transmitter of a device, a radio-frequency (RF) transmit signal, wherein the RF transmit signal causes non-linear interference to a received signal at a receiver of the device;

generating an auxiliary analog baseband signal based, at least in part, on the RF transmit signal; and providing transmit information and the auxiliary analog baseband signal to the receiver for use by the receiver to remove the non-linear interference associated with the RF transmit signal, wherein the transmitter and the receiver are on different integrated circuits of the device, and wherein the auxiliary analog baseband signal and the transmit information are provided via an interface between the different integrated circuits.

45. The non-transitory machine-readable medium of claim 44, wherein transmitting the RF transmit signal comprises:

receiving an original analog baseband signal from a digital backend of the transmitter; and generating the RF transmit signal based, at least in part, on the original analog baseband signal.

46. The non-transitory machine-readable medium of claim 44, wherein said generating the auxiliary analog baseband signal from the RF transmit signal comprises down-converting the RF transmit signal.

47. The non-transitory machine-readable medium of claim 44, wherein transmitting the RF transmit signal induces non-linear distortion at one or more harmonics of the RF transmit signal.

48. A system, comprising:

means for transmitting, at a transmitter of the system, a radio-frequency (RF)transmit signal, wherein the RF transmit signal causes non-linear interference to a received signal at a receiver of the system;

means for generating an auxiliary analog baseband signal based, at least in part, on the RF transmit signal; and means for providing transmit information and the auxiliary analog baseband signal to the receiver for use by the receiver to remove the non-linear interference associated with the RF transmit signal, wherein the transmitter and the receiver are on different integrated circuits of the system, and wherein the auxiliary analog baseband signal and the transmit information are provided via an interface between the different integrated circuits.

49. The system of claim 48, wherein the means for transmitting the RF transmit signal comprises:

means for receiving an original analog baseband signal from a digital backend of the transmitter; and means for generating the RF transmit signal based, at least in part, on the original analog baseband signal.

50. The system of claim 48, wherein the means for generating the auxiliary analog baseband signal from the RF transmit signal comprises means for down-converting the RF transmit signal.

51. The system of claim 48, wherein the means for transmitting the RF transmit signal induces non-linear distortion at one or more harmonics of the RF transmit signal.

* * * * *